United States Patent [19]

Sweetman

[11] Patent Number: 4,667,140
[45] Date of Patent: May 19, 1987

[54] BATTERY POWERED MOTOR DRIVE WITH TEMPERATURE-RESPONSIVE BATTERY HEATER

[75] Inventor: James D. Sweetman, Manitowoc, Wis.

[73] Assignee: Paragon Electric Co., Inc., Two Rivers, Wis.

[21] Appl. No.: 703,275

[22] Filed: Feb. 20, 1985

[51] Int. Cl.⁴ .............................................. H02I 8/00
[52] U.S. Cl. ................................. 318/696; 318/685; 320/35; 307/66
[58] Field of Search ............... 318/696, 685; 368/157, 368/185; 320/21, 35; 361/386; 358/153; 307/66

[56] References Cited

U.S. PATENT DOCUMENTS 4,229,687 10/1980 Newman ................................. 320/2
4,233,680 11/1980 Sudler et al. ......................... 368/76
4,334,243 6/1982 Srivastava ........................... 358/153

Primary Examiner—William M. Shoop, Jr.
Assistant Examiner—Saul M. Bergmann
Attorney, Agent, or Firm—Foley & Lardner

[57] ABSTRACT

An improved battery powered quartz timing control circuit that drives a stepper motor, featuring a battery heated by a temperature-responsive battery heater which is activated when the ambient temperature in the vicinity of the battery drops below a predetermined temperature.

2 Claims, 4 Drawing Figures

BATTERY POWERED MOTOR DRIVE WITH TEMPERATURE-RESPONSIVE BATTERY HEATER

BACKGROUND OF THE INVENTION

This invention relates to a battery powered timing control circuit that drives a stepper motor, and includes a temperature-responsive battery heater.

As is well known in the art fields of battery powered apparatus and auxiliary battery powered apparatus, whenever a battery supplies a DC voltage in extremely cold temperatures, the temperature may substantially reduce the performance of the battery. This probelm acutely affects timing control apparatus subject to extremely cold external environments that rely on a stepper motor to turn the dial of a timing mechanism. In timing control circuits that drive a stepper motor, maintaining a substantially constant temperature in the vicinity of the battery allows for recharging of the battery without causing damage to the battery that might result if recharged at extremely cold temperatures. Also, in a timing control circuit with a full-wave recitified and recharging circuit that continually recharges the battery, a temporary AC power failure will stop the recharging of the battery, and require that the battery supply a substantially constant voltage to both the timing control circuit and the stepper motor until the AC power is restored.

The prior art evidences no battery powered time control circuits in combination with a temperature-responsive heating element designed to carefully monitor the temperature of the battery supply to produce a substantially constant voltage to the timing control circuit and the stepper motor, irrespective of ambient temperature change in the vicinity of the battery.

SUMMARY OF THE INVENTION

A battery powered timing control circuit drives a stepper motor, featuring a battery heated by a temperature-responsive battery heater which is activated when the ambient temperature in the vicinity of the battery drops below a predetermined temperature. The time control circuit comprises a quartz drive digital circuit which produces timing control signals at selected intervals and drives a stepper motor. A stepper motor requires high current drive from the voltage supply source, and the source must be capable of producing a substantially constant current at all times. The voltage supply source is comprised of an AC power supply, a battery, a full wave rectifier and a DC charging circuit that allows the AC power source to continually recharge the battery. The battery supplies power to drive both the stepper motor and the timing control circuit. During a temporory AC power failure, when the battery is no longer being recharged, the battery must continue to supply the high current drive to the stepper motor and power to the timing control chips. In extremely cold temperatures, the current output of a battery is significantly reduced and the battery amy be damaged if recharged. To minimize the effects of this reduction, a temperature-responsive battery heater will activate when the ambient temperature falls below a predetermined temperature and heats the battery. This assures that the battery will operate effectively in extremely cold temperatures and during temporary AC power failures.

BRIEF DESCRIPTIONS OF THE DRAWINGS

Figure 1:
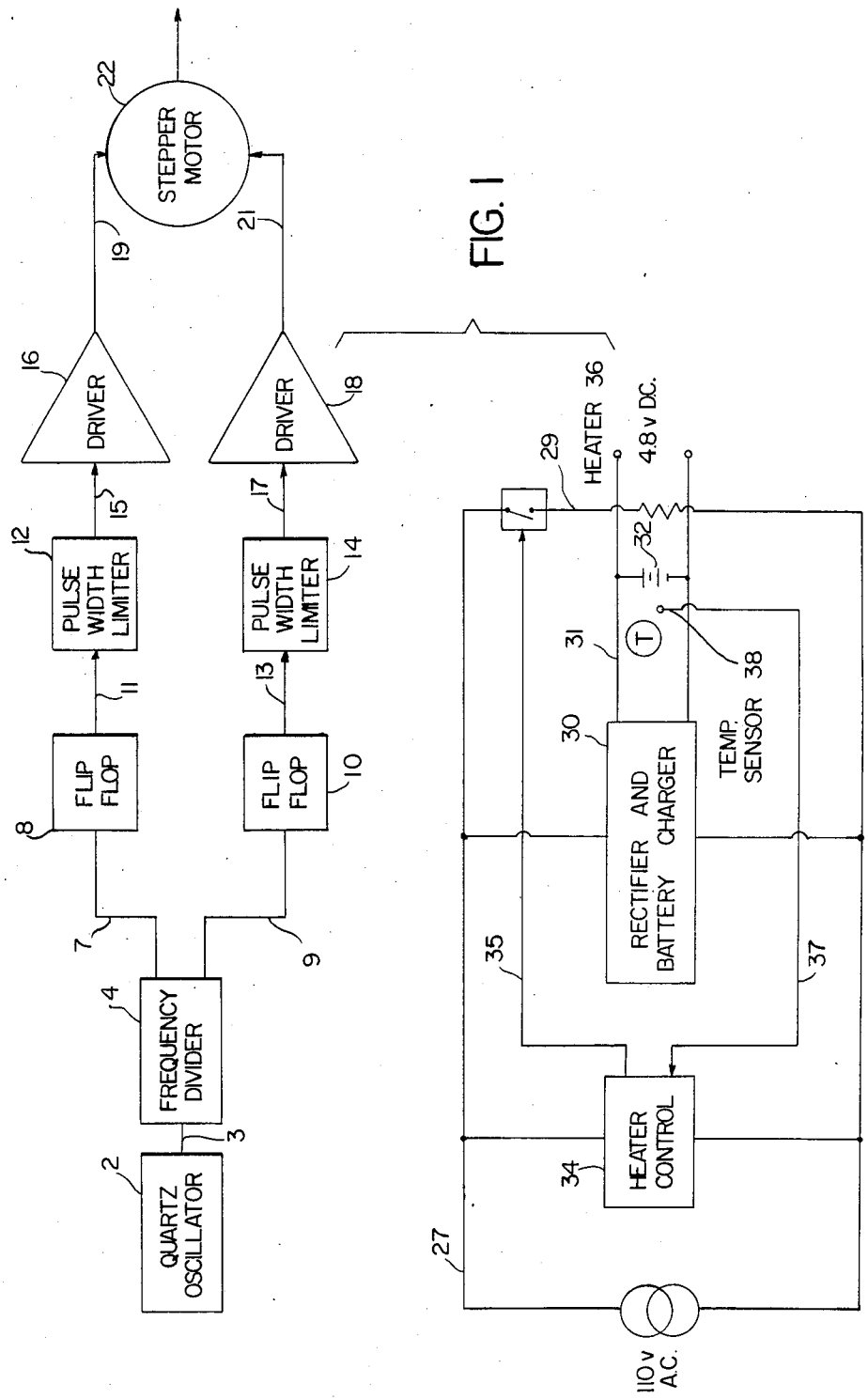
FIG. 1 is a block diagram of a battery power quartz drive.

In FIG. 1, the driving circuit is comprised of the following. An oscillator circuitry 2 generates periodic pulse signals which pass along bus 3 to frequency divider 4. The frequency divider 4 counts the periodic pulse signals and produces timing control signals that alternately activate a first and second channel actuation means comprised of a flip flop, pulse width limiter, and current drive, along buses 7 or 9 respectively. The flip-flop 8 or 10 receives the timing control signals and produces a voltage pulse signal of a fixed duration along buses 11 or 13 respectively. The pulse width limiter 12 or 14 receives the voltage pulse signal, limits a voltage pulse signal greater than a predetermined duration, and produces a current biasing signal along bus 15 or 17. The current driver 16 or 18 receives the current biasing signal and produces a current pulse signal of fixed duration along buses 19 or 21, respectively. The stepper motor 22 receives the current pulse signals and produces corresponding stepping actions.

The battery charging and heating circuit are comprised of the following. The AC voltage supply is coupled along bus 27 to the rectifier and battery charging circuit 30, and along bus 29 to the battery heater 36. The battery charging circuit 30 operates continually to recharge the battery 32 along bus 31. The battery heater control 34 receives a temperature signal from temperature sensor 38, such as a thermister device, along bus 37. In the preferred embodiment, the thermister is located an eighth ($\frac{1}{8}$") inch to one-quarter ($\frac{1}{4}$") inch above the battery. This temperature sensor 38 measures the ambient temperature in the vicinity of the battery 32. Depending on the ambient temperature sensed by sensor 38, the heater control 34 will produce a heater control signal along bus 35 to activate or deactivate the battery heater 36. In the preferred embodiment, the battery heater 36 is located directly below the battery 32 on the PC board. The battery heater 36 operates to maintain a relatively steady ambient temperature in the vicinity of the battery 32, thereby permitting battery 32 to recharge at low temperatures without damage.

Figure 2:
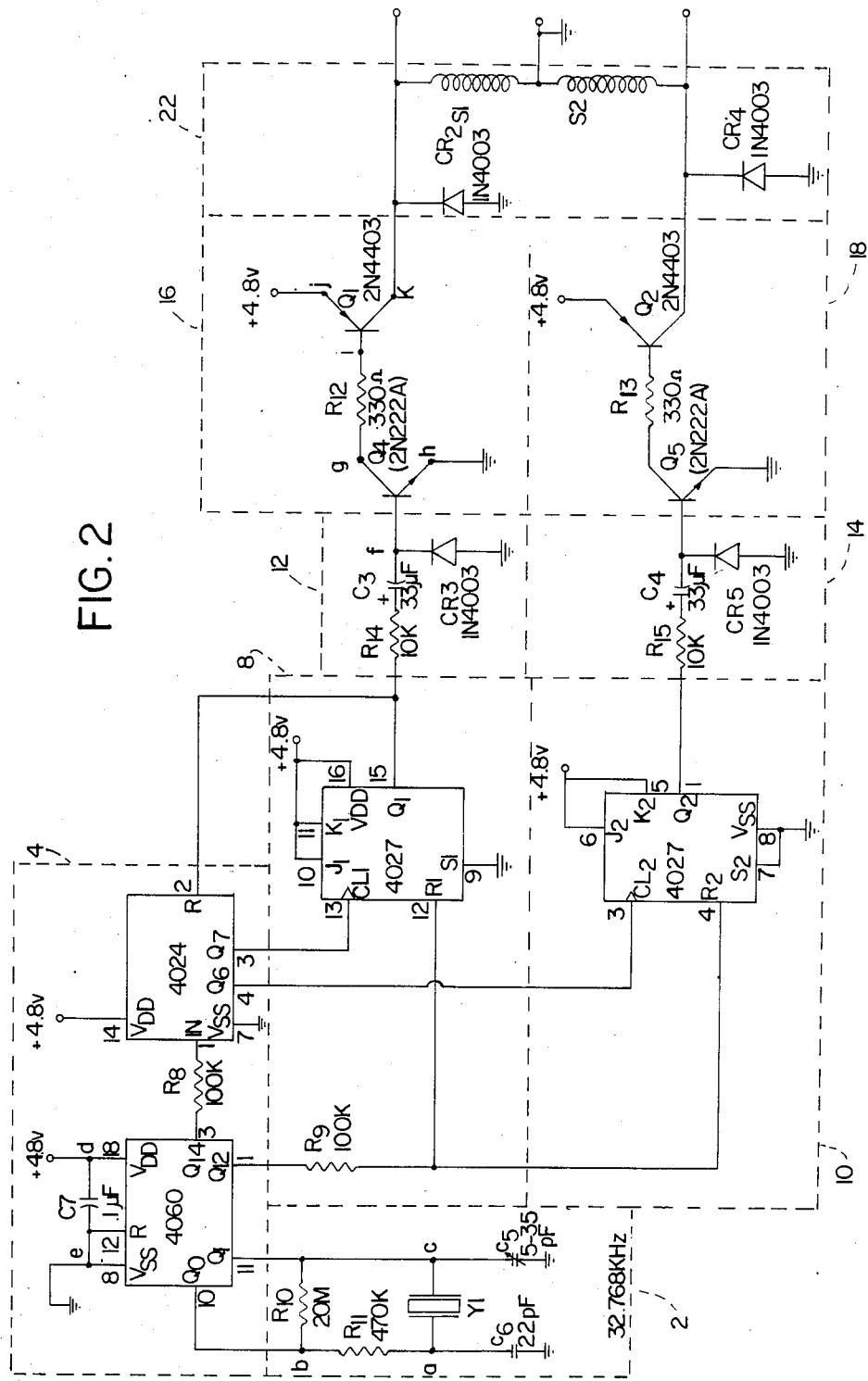
FIG. 2 is a circuit diagram of a timing control device.

The oscillator circuitry 2 comprises the following. In FIG. 2, at point (hereinafter pt.) a, crystal Y1 is coupled to capacitor C6 which is connected to ground. At pt. b, resistors R11 and R10 form a voltage divider network. R11 is coupled to crystal Y1 at pt. a and coupled to resistor R10 at pt. b. The junction of resistors R11 and R10 at pt. b is then coupled into the crystal oscillator input at (P10) of the CD4060 chip of the frequency divider 4. At pt. c, crystal Y1 is coupled to capacitor C5 which is connected to ground. Capacitor C5 functions as a timing capacitor to control the frequency of the oscillator circuitry 2. At pt. c, resistor R10 is coupled to crystal Y1, and the junction of resistors R10 and crystal Y1 is then coupled into the crystal oscillator input at (P11) of the CD4060 chip. In total, the oscillator circuitry is coupled into inputs (P10) and (P11) to active elements within the CD4060, and the oscillator circuitry 2 serves as a negative feedback circuit which combines with the active element to generate periodic pulse signals. See the CMOS Data Book National Semiconductor Corporation, Copyrighted 1981 National Semiconductor Corporation which illustrates this traditional quartz drive circuitry, hereby incorporated by reference.

The frequency divider 4 is comprised of a CD4060, a 14-Stage Ripple Carry Binary Counter, and CD4024, a 7-Stage Ripple Carry Binary Counter. See CMOS Data Book National Semiconductor Corporation, Copyrighted 1981 National Semiconductor Corporation. The frequency divider 4 receives the preiodic pulse signals from the oscillator circuitry 2 and produces control signals that reset flip-flops 8 and 10, and timing control signals that clock flip-flops 8 and 10.

The CD4060 is a counter that advances one count on the negative-going transition of each periodic pulse signal. The battery of +4.8 volts is coupled to the inputs at VDD(P18). (The battery 32 supplies the 4.8 volts to all the timing control chips in FIG. 2.) At pt. d, the input at VDD(P18) and the battery are coupled to capacitor C7. The other side of capacitor C7 is connected to ground at pt. e. Capacitor C7 will minimize voltage fluctuation from the battery to the input at VDD(P18). The input at VSS(P8) and the input at reset R(P12) are both connected to ground at pt. e. In this circuit the counter will count up to $2^{14}$ (16,384).

The output at Q12(P1) of the CD4060 is a control signal that resets the flip-flops 8 and 10 at the count of $2^{11}$ (2048). CD4027 is a Dual J-K Master/Slave Flip Flop with Set and Reset. The output at Q14(p3) of the CD4060 produces a control signal that initiates another 7-stage counter in the CD4024. The output at Q14(P3) is coupled through resistor R8 to input at IN(P1). The counter of the CD4024, is advanced one count pulse on the negative-going transition of each pulse at input IN(P1). The outputs at Q6(P4) and Q7(P3) of the CD4024 produce the timing control signals that clock the respective flip-flops 8 or 10, coupled into the clock inputs at CL1(P3) and CL2(P3) of the CD4027, respectively. The battery of +4.8 volts is coupled to the input at VDD(P14), and the input at VSS(p7) is grounded. The counter of the CD4024 will produce the timing control signals at the count of $2^6$(64) and $2^7$(128) periodic pulse signals on the counter, and then resets to the logical zero "0" state. The flip-flops 8 and 10 are edge sensitive to the clock input and change state on the positive-going transitions of the clock inputs at CL1(P13) and CL2(P3). See the CMOS Data Book National Semiconductor corporation, Copyrighted 1981 National Semiconductor Corporation. The inputs at J1(P10), K1(P11), J2(P6), K2(P5) and VDD(P16) of the CD4027 are coupled to the battery of +4.8 V. The inputs at set S1(P9) and S2(P7) are coupled to ground. The input at VSS(P8) is coupled to ground. The flip-flop 8 or 10 receives the control signal and the timing control signal and produces a voltage pulse signal of a fixed duration.

At the total count of $2^{19}$ (524,288) periodic pulse signals from oscillator 2, the output at Q6(P4) of CD 4024 will produce a timing control signal. The output at Q6(P4) is coupled to the clock input 2 at CL2(P3) of the CD4027. Since the inputs at J2(P6) and K2(P5) are connected to the battery of +4.8 volts, the output at Q2(P1) changes to the high voltage state on the positive-going transition of the timing control signal. The output of the flip-flop 10 now produces a voltage pulse signal for a fixed duration of $2^{11}$ (2048) periodic pulse signals, until the output at Q12(P1) of the CD4060 produces a control signal into the input at reset R1(P12) and R2(P4) of the CD4027, resetting of the CD4027 to logical "0" state.

At the further total count of 220 (1,048,576) periodic pulse signals, the output at Q7(P3) of the CD4024 will produce a timing control signal. The output at Q7(P3) is coupled to the clock input CL1(P13) of the CD4027. Since the inputs at J1(P10) and K1(P11) of the CD4027 are connected to the battery of +4.8 volts, the output at Q1(P15) of the CD4027 changes to the high voltage state on the positive-going transition of the clock pulse. The flip-flops 8 in FIG. 1 now produces a voltage pulse signal of a fixed duration. The output at Q1(P15) is coupled to the input at the reset R(P2) of the CD4024. And the high voltage state at the output at Q1(P15) will reset the counter of the CD4024. Note here that the resetting of the counter of the CD4024 does not affect the duration of the output at Q1(P15) because the flip-flop of the CD4027 is edge sensitive to the clock input and changes states on the positive-going transition of the clock pulse input at CL1(P13). Again the output of the flip-flop 8 will remain high for a fixed duration of $2^{11}$ (2048) periodic pulse signals, until the output at Q12(P1) of the CD4060 produces a control signal into the inputs at resets R1(P12) and R2(P4) of the Cd4027, resetting the flip-flops of the CD4027.

Note in FIG. 1 that a pair of channels activates the stepper motor 22. Each channel comprises a flip-flop 8 or 10, a pulse width limiter 12 or 14, and current drives 16 or 18. The pair of channesl are essentially identical.

The output at Q1(P15) of the CD4027 produces a voltage pulse signal which passes into the pulse width limiter 12 in FIG. 1. As illustrated, the pulse width limiter 12 comprises of a 10K ohm resistor R14, a 33 micro farad capacitor C3 and a diode CR3. The pulse width limiter 12 receives the voltage pulse signal of a fixed duration, limits a voltage pulse signal greater than a predetermined duration and produces a current biasing signal. The pulse width limiter 12 serves to keep the motor de-energized when the battery discharges to a voltage level where the flip-flop 8 or 10 stops working correctly.

The output at Q1(P15) is coupled to resistor R14 and capacitor C3. The resistor and capacitor determine an RC charging constant for the capacitor to charge. As the output at Q1(P15) changes to a high voltage signal, capacitor C3 will begin to charge to the voltage produced at the output at Q1(P15), and the voltage at pt. f will also rise causing a current surge into the base of transistor Q4 so that transistor Q4 will conduct.

When the output at Q1(P15) produces a low voltage signal, capacitor C3 will discharge through diode IN4003 CR3. At pt. f, capacitor C3 is coupled to diode CR3, and diode CR3 is connected to ground. If this output at Q1(P15) remains at a high voltage level, and capacitor C3 has completely charged, current will cease to flow through resistor R14 and therefore through transistor Q4. When the voltage across resistor R14 equals zero, the current equals zero, turning off transistor Q4. This is the essence of the pulse width limiter. This effectively limits the pulse to the stepper motor 22, which allows the battery to recharge at necessary intervals.

Figure 4:
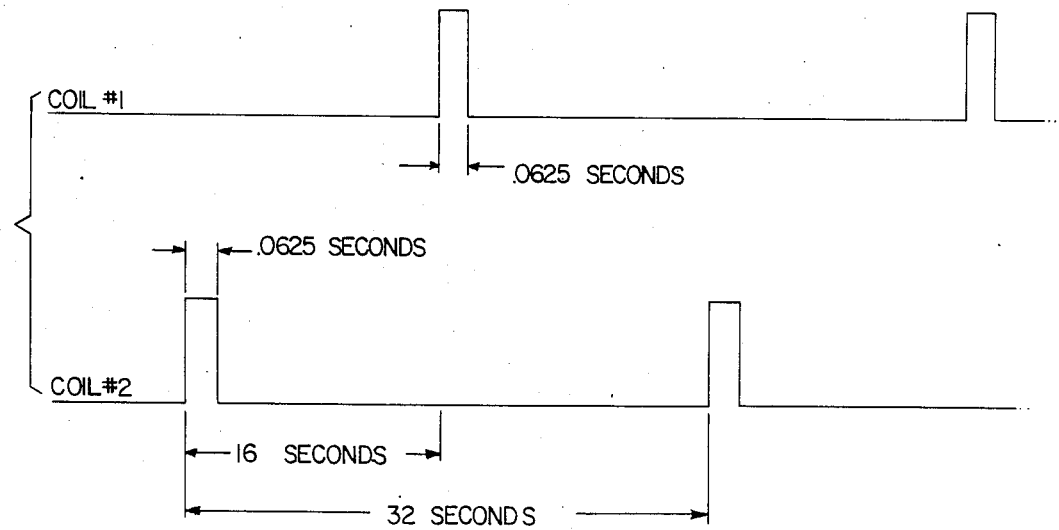
FIG. 4 is a timing diagram of the stepping function if a quartz drive motor.

The current driver 16 in FIG. 1 functions as follows. The current biasing signal will cause transistor Q4 to conduct and current to flow, driving current through resistor R12. The supply voltage of +4.8 volts is coupled to the emitter of transistor Q1. Current flow through resistor R12 will cause transistor Q1 to conduct and produce a current pulse signal of a fixed duration through transistor Q1 from the emitter to the collector, then into the coil S1 of the stepper motor 22. This current pulse signal will drive the stepper motor 22. FIG. 4 illustrates the timing of the current pulse signals on the respective channels. The diode IN4003 CR2 functions to protect the circuit against excessive voltage surges that occur when either of the coils S1 or S2 de-energizes. Stepper motor 22 is a two coil bifilar wound stepper motor comprised of coils S1 and S2. In the preferred embodiment stepper motor 22 truns the dial of a timing mechanism.

Figure 3:
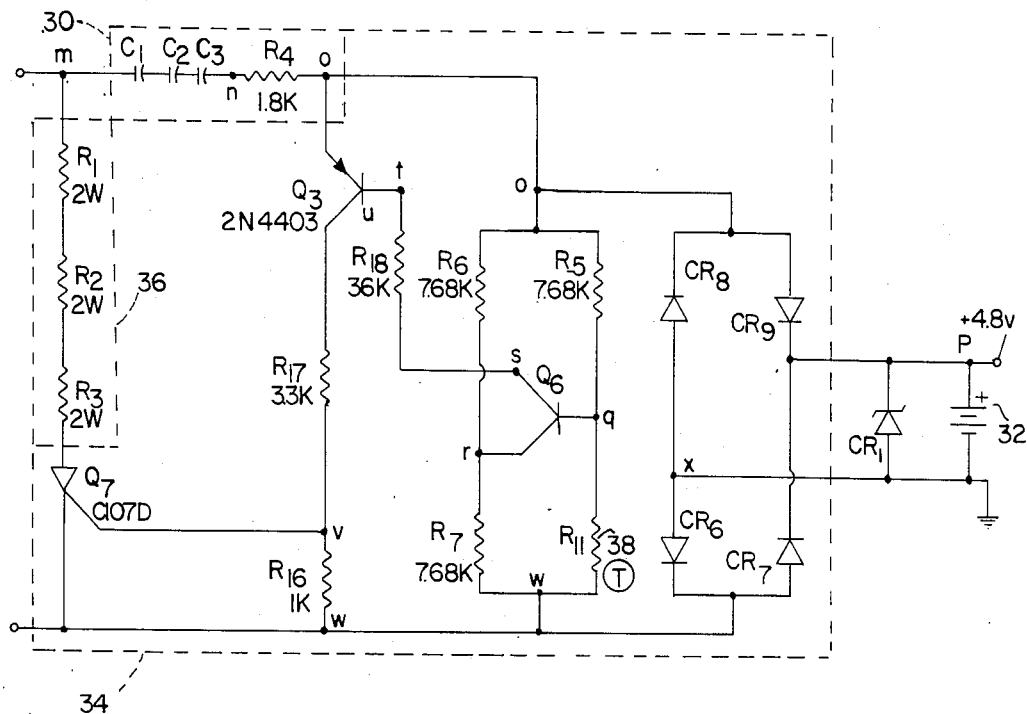
FIG. 3 is a circuit diagram of a full wave rectifier, battery charger and temperature-responsive battery warmer.

FIG. 3 illustrates a circuit consisting of a full wave rectifier to transform an AC power source to a DC power source, a battery charger to continually recharge a battery supply, and a temperature sensor adjacent the battery to activate a battery heating circuit when the ambient temperature in the vicinity of the battery decreases below a predetermined temperature. The temperature sensor 38 and heating resistors 36 are located adjacent the battery 32 to sense and heat the ambient temperature of the battery 32.

The full wave rectifying and battery charging circuit comprises capacitors C1, C2, and C3 coupled in series through resistor R4 at pt. o and a diode bridge CR6, CR7, CR8 and CR9 that operates to recitify the AC power source. The operation of this type of rectifier is also very well known in the art.

The battery heating circuit operates under the control of a thermistor T, located $\frac{1}{8}''$ to $\frac{1}{4}''$ directly above the battery, and and controls the current flow through heating resistors R1, R2, R3 when the ambient temperature in the vicinity of the battery drops below a predetermined temperature. As illustrated in FIG. 3, the resistor network is coupled across the AC voltage supply, resistor R5 is coupled to thermistor R11, and resistor R6 is coupled to resistor R7. Transistor Q6 bridges this resistor network with the base of transistor Q6 at pt. q coupled between resistors R5 and R11, and the emitter of transistor Q6 coupled between resistors R6 and R7, connecting the resistor network together. When the ambient temperature in the vicinity of battery decreases in value, the resistance of the thermistor R11 increases, causing the voltage level at pt. q to rise, causing transistor Q6 to conduct, and producing a heating control signal.

When transistor Q6 conducts, current flows from the collector to the emitter of transistor Q6. The transistor Q6 drives current through resistor R18, coupled from the collector of transistor Q6 at pt. s to the base of transistor Q3 at pt. t, thereby increasing the current level at pt. t. When the transistor Q6 conducts, transistor Q3 conducts. When transistor Q3 conducts, current flows from the emitter to the collector of transistor Q3. The collector of transistor Q3 is coupled through a voltage divider circuit consisting of resistors R17 and R16. As current passes through resistors R16 and R17, the silicon controlled rectifier Q7 conducts. Once the silicon controlled recitifier Q7 conducts, current will flow through the heating resistors. The heating resistors comprise three resistors R1, R2 and R3 in series, located adjacent the battery on the PC board.

As the heating resistors increase the ambient temperature in the vicinity of the battery, the resistivity of thermistor R11 will decrease, causing the voltage at the base of transistor Q6 to decrease, no longer producing the heating control signal. Transistor Q6 will no longer conduct; transistor Q3 will not conduct; and no current will flow from the emitter to the collector of transistor Q3. Since no current will flow through R16 and R17, the silicon controlled rectifier Q7 will not conduct. This will stop the flow of current through the heating resistors R1, R2 and R3, which effectively shuts off the battery heater.

The improved battery powered motor drive has the advantage that it can recharge without damage to the battery in extremely cold temperatures which results in a more reliable and more precisely driven stepping motor. And the timing control circuit in combination with a temperature-responsive battery heater will more reliably and more precisely drive a stepper motor to turn the dial of a timing mechanism subject to extremely cold external environment.

What is claimed is:

1. In a battery powered timing control circuit for driving a stepping motor with current pulses, said circuit having a temperature responsive battery heater and a battery charging circuit, improved means for driving the stepping motor, the combination comprising voltage supply means adapted to rectify an AC voltage signal and produce energizing DC voltage signals;

oscillator means adapted to generate periodic pulse signals;

frequency dividing means for receiving said periodic pulse signals and producing control signals in response thereto;

pulse forming means responsive to said control signals for producing pulsed signals in response thereto;

current driving means responsive to pulsed signals for producing current pulse signals, stepper motor means coupled to receive said current pulse signals and adapted to produce a corresponding stepping action in response thereto;

battery supply means adapted to supply a substantially constant DC voltage supply signal to said oscillator means, said frequency dividing means, said pulse forming means, said current driver means and said stepper motor means;

pulse width limiting means coupled to receive said pulsed signals from said pulse forming means and coupled to supply pulses to said current driving means, the pulse width limiting means operating to limit the duration of signals received from the pulse forming means so as not to exceed a predetermined duration, whereby the input to the current driving means will be limited to signals that do not exceed said predetermined duration, thereby to prevent a continuous current input to said motor and corresponding continuous drain on said battery, and;

battery recharging means adapted to recharge continually said battery supply means from said AC voltage signal;

control means for monitoring the ambient temperature adjacent said battery means and producing a heating control signal when the ambient temperature drops below a predetermined temperture, and;

heating means for receiving said heating control signal to maintian the ambient temperature in the vicinity of said battery means above said predetermined temperature level, whereby said battery provides a substantially constant D.C. voltage signal to said oscillator means, said frequency divider means, said flip-flop means, said pulse width limiter means, said current driver means, and said stepper motor means.

2. In a battery powered timing control circuit for driving a stepping motor with current pulses, said circuit having a temperature responsive battery heater andd a battery charging circuit, improved means for driving the stepping motor, the combination comprising voltage supply means adapted to rectify an AC voltage signal and produce energizing DC voltage signals;

oscillator means adapted to generate periodic pulse signals;

frequency dividing means for receiving said periodic pulse signals and producing control signals in response thereto;

pulse forming means responsive to said control signals for producing pulsed signals in response thereto;

current driving means responsive to pulsed signals for producing current pulse signals, stepper motor means coupled to receive said current pulse signals and adapted to produce a corresponding stepping action in response thereto;

battery supply means adapted to supply a substantially constant DC voltage suply signal to said oscillator means, said frequency dividing means, said pulse forming means, said current driver means and said stepper motor means;

pulse width limiting means coupled to receive said pulsed signals from said pulse forming means and coupled to supply pulses to said current driving means, the pulse width limiting means operating to limit the duration of signals received from the pulse forming means so as not to exceed a predetermined duration, whereby the input to the current driving means will be limited to signals that do not exceed said predteremined duration, thereby to prevent a continuous current input to said motor and corresponding continuous drain on said battery, and;

battery recharging means adapted to recharge continually said battery supply means from said AC voltage signal.

* * * * *